(12) United States Patent
    Gibson

(10) Patent No.: US 12,614,427 B2
(45) Date of Patent: Apr. 28, 2026

(54) GAMING MACHINE DISPLAY AND DISPLAY METHOD WITH MULTIPLE BRIGHTNESS LEVELS

(71) Applicant: Everi Games Inc., Austin, TX (US)

(72) Inventor: Daniel Gibson, Austin, TX (US)

(73) Assignee: Everi Games Inc., Austin, TX (US)

( * ) Notice: Subject to any disclaimer, the term of this patent is extended or adjusted under 35 U.S.C. 154(b) by 246 days.

(21) Appl. No.: 18/521,486

(22) Filed: Nov. 28, 2023

(65) Prior Publication Data

US 2025/0118131 A1     Apr. 10, 2025

Related U.S. Application Data

(60) Provisional application No. 63/542,978, filed on Oct. 6, 2023.

(51) Int. Cl.
| | |
|---|---|
| *G07F 17/00* | (2006.01) |
| *G02F 1/1335* | (2006.01) |
| *G07F 17/32* | (2006.01) |
| *H05B 47/155* | (2020.01) |
| *G07F 17/34* | (2006.01) |

(52) U.S. Cl.
CPC .... *G07F 17/3211* (2013.01); *G02F 1/133612* (2021.01); *G07F 17/3216* (2013.01); *H05B 47/155* (2020.01); *G07F 17/3209* (2013.01); *G07F 17/34* (2013.01)

(58) Field of Classification Search
None
See application file for complete search history.

(56) References Cited

U.S. PATENT DOCUMENTS

| | | | | |
|---|---|---|---|---|
| 9,082,256 B2 * | 7/2015 | Griswold | ............ | G07F 17/3211 |
| 9,141,329 B1 * | 9/2015 | Reicher | .............. | G06F 3/04886 |
| 9,208,654 B2 * | 12/2015 | Kondo | .................... | G07F 17/34 |
| 9,633,524 B2 * | 4/2017 | Kitamura | ................ | G07F 17/34 |
| 10,034,343 B2 * | 7/2018 | Hussain | ................ | H05B 45/10 |
| 10,453,295 B2 * | 10/2019 | Arnone | .............. | G07F 17/3223 |
| 10,504,453 B1 * | 12/2019 | Jung | .................... | G09G 3/3648 |
| 2005/0255907 A1 * | 11/2005 | Gauselmann | ....... | G07F 17/3227 463/20 |
| 2008/0227527 A1 * | 9/2008 | Canterbury | ........... | G07F 17/323 463/16 |

(Continued)

*Primary Examiner* — Paul A D'Agostino
(74) *Attorney, Agent, or Firm* — Sheridan Ross P.C.

(57)     ABSTRACT

A gaming machine display device includes a display device housing and an image forming panel mounted on the display device housing. The image forming panel defines an overall display area facing in an image presenting direction and encompasses both a first display area and a distinct second display area. The gaming machine display device further includes both first and second backlighting arrangements mounted within the display device housing. The first backlighting arrangement is operable for emitting first display area backlight over the first display area at a first brightness level. The second backlighting arrangement is operable for emitting second display area backlight over the second display area. This second display area backlight is switchable between a first illumination state at the first brightness level and a second illumination state at a higher second brightness level while the first display area backlight remains at the first brightness level.

13 Claims, 7 Drawing Sheets

(56) References Cited

U.S. PATENT DOCUMENTS

| | | | | |
|---|---|---|---|---|
| 2008/0315785 A1* | 12/2008 | Price | H05B 41/282 | 315/277 |
| 2010/0081502 A1* | 4/2010 | Rasmussen | G07F 17/3211 | 349/1 |
| 2010/0144432 A1* | 6/2010 | Nittou | G02F 1/133553 | 463/30 |
| 2010/0190552 A1* | 7/2010 | Rasmussen | G07F 17/3211 | 463/34 |
| 2012/0115566 A1* | 5/2012 | Fujisawa | G07F 17/34 | 463/20 |
| 2013/0135560 A1* | 5/2013 | Lee | G02F 1/00 | 349/65 |
| 2013/0252709 A1* | 9/2013 | Lee | G02F 1/133615 | 463/20 |
| 2013/0310138 A1* | 11/2013 | Kitamura | G07F 17/34 | 463/20 |
| 2013/0310143 A1* | 11/2013 | Kondo | G07F 17/34 | 463/20 |
| 2014/0066164 A1* | 3/2014 | Okada | G07F 17/3211 | 463/20 |
| 2014/0097765 A1* | 4/2014 | Hussain | H05B 45/22 | 315/224 |
| 2014/0315617 A1* | 10/2014 | Fujisawa | G07F 17/3262 | 463/20 |
| 2014/0339768 A1* | 11/2014 | Kitamura | G07F 17/3213 | 273/143 R |
| 2015/0072758 A1* | 3/2015 | Aoki | G07F 17/3211 | 463/20 |
| 2015/0087384 A1* | 3/2015 | Brewer | G07F 17/3202 | 463/20 |
| 2015/0087391 A1* | 3/2015 | Kitamura | G07F 17/3213 | 463/20 |
| 2015/0247966 A1* | 9/2015 | Kim | G02B 6/008 | 463/31 |
| 2015/0296580 A1* | 10/2015 | Kim | G09G 3/3426 | 315/294 |
| 2015/0346420 A1* | 12/2015 | Niu | G02B 6/0053 | 362/606 |
| 2016/0089607 A1* | 3/2016 | Ike | G07F 17/3211 | 463/29 |
| 2016/0093146 A1* | 3/2016 | Kitamura | G07F 17/3258 | 463/20 |
| 2017/0004673 A1* | 1/2017 | Loose | G07F 17/3209 | |
| 2017/0053477 A1* | 2/2017 | Miller, Sr. | G07F 17/34 | |
| 2017/0090269 A1* | 3/2017 | Huang | G02B 6/005 | |
| 2018/0071620 A1* | 3/2018 | Ono | G06F 3/041 | |
| 2018/0144673 A1* | 5/2018 | Prema | G09G 3/20 | |
| 2018/0336758 A1* | 11/2018 | Scott | G07F 17/3211 | |
| 2019/0045591 A1* | 2/2019 | Xie | H05B 45/48 | |
| 2019/0265548 A1* | 8/2019 | Liu | G02F 1/133606 | |
| 2019/0285950 A1* | 9/2019 | Liu | H05K 3/3431 | |
| 2020/0103705 A1* | 4/2020 | Chen | H05B 45/32 | |
| 2020/0111301 A1* | 4/2020 | Wasinger | G07F 17/3267 | |
| 2020/0279450 A1* | 9/2020 | Bernard | G07F 17/3213 | |
| 2021/0118257 A1* | 4/2021 | Anderson | G07F 17/3216 | |
| 2021/0327394 A1* | 10/2021 | Bui | G06F 1/3231 | |
| 2021/0364854 A1* | 11/2021 | Lum | H05B 47/105 | |
| 2021/0375096 A1* | 12/2021 | Sanborn | G07F 17/3213 | |

* cited by examiner

GAMING MACHINE DISPLAY AND DISPLAY METHOD WITH MULTIPLE BRIGHTNESS LEVELS

CROSS-REFERENCE TO RELATED APPLICATION

Applicant claims the benefit, under 35 U.S.C. § 119(e), of U.S. Provisional Patent Application No. 63/542,978 filed Oct. 6, 2023, and entitled "Gaming Machine Display and Display Method with Multiple Brightness Levels." The entire content of this provisional application is incorporated herein by this reference.

TECHNICAL FIELD OF THE INVENTION

The invention relates to gaming machine display devices such as video display monitors used to display various graphic elements associated with a game available for play through the gaming machine. More particularly, the invention relates to display devices and methods for increasing brightness in an area of a display device.

BACKGROUND OF THE INVENTION

Liquid crystal display ("LCD") devices include a number of elements layered together to provide the desired image. Generally, an LCD device includes a liquid crystal panel layer associated with electrode layers, light polarizing filter layers, and a color filter layer, all packaged together in a particular order with respect to an image presenting direction. These layers together with any protective transparent cover (and a touch sensitive element layer for touchscreen LCD devices) can be thought of as an image forming panel for the LCD display device. A light source is provided for the image forming panel to provide a backlight across the area of the image forming panel. This backlight is manipulated by the liquid crystal panel, polarized, and color filtered on a pixel-by-pixel level to produce the desired images across the display area of the device. The backlight may be provided by illumination elements made up of cold cathode fluorescent lamps or LEDs for example. For "edge-lit" LCD devices the backlighting arrangement includes illumination elements located along the edges of the image forming panel with a light guide layer positioned parallel to the image forming panel to direct light from the edge-mounted illumination elements forwardly in the image presenting direction. "Direct-lit" LCD devices include illuminations elements arranged in a plane behind the image forming panel in position to direct the desired backlight forward in the image presenting direction toward the image forming panel.

In order to provide deeper blacks and higher contrast ratios in an LCD device, backlighting arrangements have been designed to selectively reduce the light output in localized areas of the LCD device. This selective reduction in light output in localized areas of the LCD device can be accomplished with both edge-lit and direct-lit LCD devices and is particularly desirable to improve the rendering of dark scenes in a video, such as night scenes or scenes in a darkened room or chamber. Of course, since a dark area of a scene can occur in any area of the LCD device, the ability to selectively reduce backlighting must be available across the entire area of the image forming panel in order to provide the desired improved overall image quality with deeper blacks and higher contrast ratios.

In some applications of display devices, it is desirable to not only increase the overall image quality across the display, but also to emphasize certain areas of an image relative to other areas. For example, in gaming machines in which one or more elements of a game are presented through a video display device, it may be desirable to draw spectator and player attention to a bonus feature of the game. This ability to draw attention to a certain area of a display device may be accomplished by providing eye-catching graphical effects in certain areas of the display device. While the above-described localized reduction of backlight in an LCD display can improve overall image quality, particularly for dark scenes, it does not necessarily improve graphics in game images and other images that are intended to attract an observer's attention.

SUMMARY OF THE INVENTION

It is an object of the invention to provide gaming machine display devices that may be operated to produce bright, eye-catching graphic effects in certain display areas. The invention further includes gaming machines that include such a display device and also methods for producing desirable graphic effects in defined areas of a gaming machine display device.

A gaming machine display device according to a first aspect of the present invention includes a display device housing and an image forming panel mounted on the display device housing. The image forming panel defines an overall display area facing in an image presenting direction and encompasses both a first display area and a second display area that is distinct from the first display area. "Distinct" in this sense means that the first and second display areas are different, non-overlapping portions of the overall display area. A gaming machine display device according to this first aspect of the invention further includes both a first and second backlighting arrangement mounted within the display device housing. The first backlighting arrangement is operable for emitting first display area backlight over the first display area at a first brightness level. The second backlighting arrangement is operable for emitting second display area backlight over the second display area. This second display area backlight may be switchable between a first illumination state at the first brightness level and a second illumination state at a second brightness level higher than the first brightness level while the first display area backlight remains at the first brightness level. Alternatively, the second display area backlight is not switchable between brightness levels, but rather operates statically at the second, higher brightness level.

The combination of the switchable brightness level facilitated by the second backlighting arrangement together with static brightness level provided by the first backlighting arrangement facilitates temporarily increasing the brightness in the second display area for emphasizing the images in that area of the overall display relative to the first display area. This increased brightness may be coordinated with game events presented through the gaming machine display to enhance a player's gaming experience.

A second aspect of the invention encompasses gaming machines including a display device according to the first aspect of the invention. Such a gaming machine includes a gaming machine cabinet with the above-described display device mounted thereon. The gaming machine also includes an electronic control system mounted on the gaming machine cabinet for controlling the operation of the image forming panel, first backlighting arrangement, and second backlighting arrangement of the display device.

Implementations according to either the first or second aspects described above may include a dividing feature separating the first display area and the second display area. Such a dividing feature make take any one or more of a number of different forms. For example, the dividing feature may include an opaque bezel mounted over a front surface of the of the image forming panel in the image presenting direction. Alternatively to an opaque bezel, the dividing feature may include an opaque coating located over a front surface of the image forming panel in the image presenting direction. In the case of either a bezel or an opaque coating, the display device may include a transparent front cover that covers a front surface of the image forming panel and the dividing feature may be mounted or applied on or over the transparent front cover. In addition to or in lieu of a bezel and/or an opaque coating, the dividing feature may include a light baffle extending along a boundary region between the first display area and second display area. Such a light baffle could include an opaque element extending in a plane essentially perpendicular to the plane of the display area at that location so as to help block light from bleeding over from one display area to the other, particularly from the second display area when operating at the second brightness level.

In some implementations according to either the first or second aspect of the invention, the first backlighting arrangement includes a first display area set of illumination elements operable to provide the first display area backlight over the first display area at the first brightness level. In these implementations the second backlighting arrangement includes both a second display area set of illumination elements and an additional set of illumination elements. The second display area set of illumination elements is operable to provide the second display area backlight over the second display area at the first brightness level. The additional set of illumination elements is operable together with the second display area set of illumination elements to provide the second brightness level. Alternatively to having both a second display area set of illumination elements and an additional set of illumination elements for the second backlighting arrangement, the second display area set of illumination elements may be adapted to selectively provide either the second display area backlight at the first brightness level or the second brightness level.

A third aspect of the invention encompasses methods of operating a gaming machine display device. Such a method includes over a first period of time, emitting first display area backlight at a first brightness level over a first display area of an image forming panel while the image forming panel produces one or more non-black graphic elements in the first display area. Over this same first period of time, second display area backlight is emitted at the first brightness level over a second, distinct display area of the image forming panel while the image forming panel produces one or more non-black graphic elements in the second display area. Methods according to this third aspect of the invention further include, over a second period of time different from the first period of time, emitting the second display area backlight at a second brightness level over the second display area of the image forming panel while simultaneously emitting the first display area backlight at the first brightness level over the first display area of the image forming panel. The second brightness level is higher than the first brightness level so as to accentuate images within the second display area over the second period of time.

These and other aspects, advantages, and features of the invention will be apparent from the following description of representative embodiments, considered along with the accompanying drawings.

DESCRIPTION OF REPRESENTATIVE EMBODIMENTS

Figure 1:
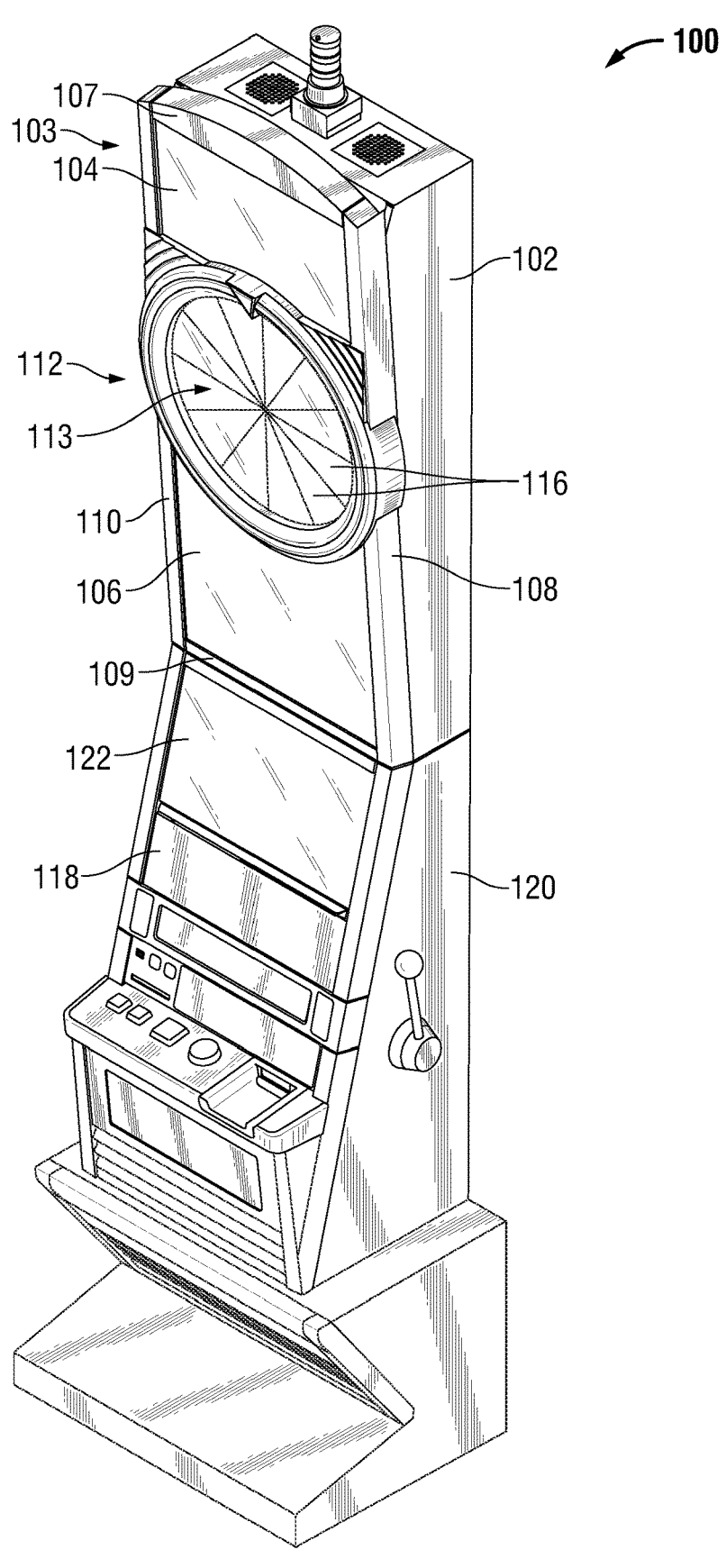
FIG. 1 is an isometric view of a gaming machine in accordance with an embodiment of the present invention.

Referring to FIG. 1, an example gaming machine 100 includes an upper cabinet portion 102 on which is mounted a display arrangement 103 having a first display device 104 and a second display device 106. A first-side display edge structure 108 runs along the right-hand vertical side of display arrangement 103 and a second-side display edge structure 110 extends along the left-hand vertical side, with a top edge structure 107 running along the top and a bottom edge structure 109 running along the bottom. FIG. 1 also shows a bezel assembly generally at 112 mounted in an operating position mostly over an area of second display device 106. Bezel assembly 112 defines a circular display area shown generally at 113. This display area 113 comprises a segregated area of the overall display area of second display device 106. In the example of FIG. 1, this segregated display area 113 displays a wheel graphic including a number of separate wheel segments 116. Gaming machine 100 also includes glass 118 covering mechanical reels (the reels not shown) mounted for rotation within a lower cabinet portion 120. Gaming machine 100 further includes a third display device 122 also mounted on lower cabinet portion 120. This third display device 122 may comprise a touchscreen display device.

As will be described further below, in the example gaming machine 100 of FIG. 1, second display device 106 comprises a display device having switchable brightness levels in a portion of the overall display area in accordance with aspects of the present invention. Bezel assembly 112 provides at least part of a dividing feature for second display device 106. Of course, the present invention is not limited to display devices shown in the position of second display device 106 in FIG. 1. Also, although the example in FIG. 1 includes only second display device 106 as the sole switchable brightness display device in gaming machine 100, any of the other display devices, such as first display device 104 and/or third display device 122 may comprise a switchable brightness display device in accordance with aspects of the present invention.

Figure 2:
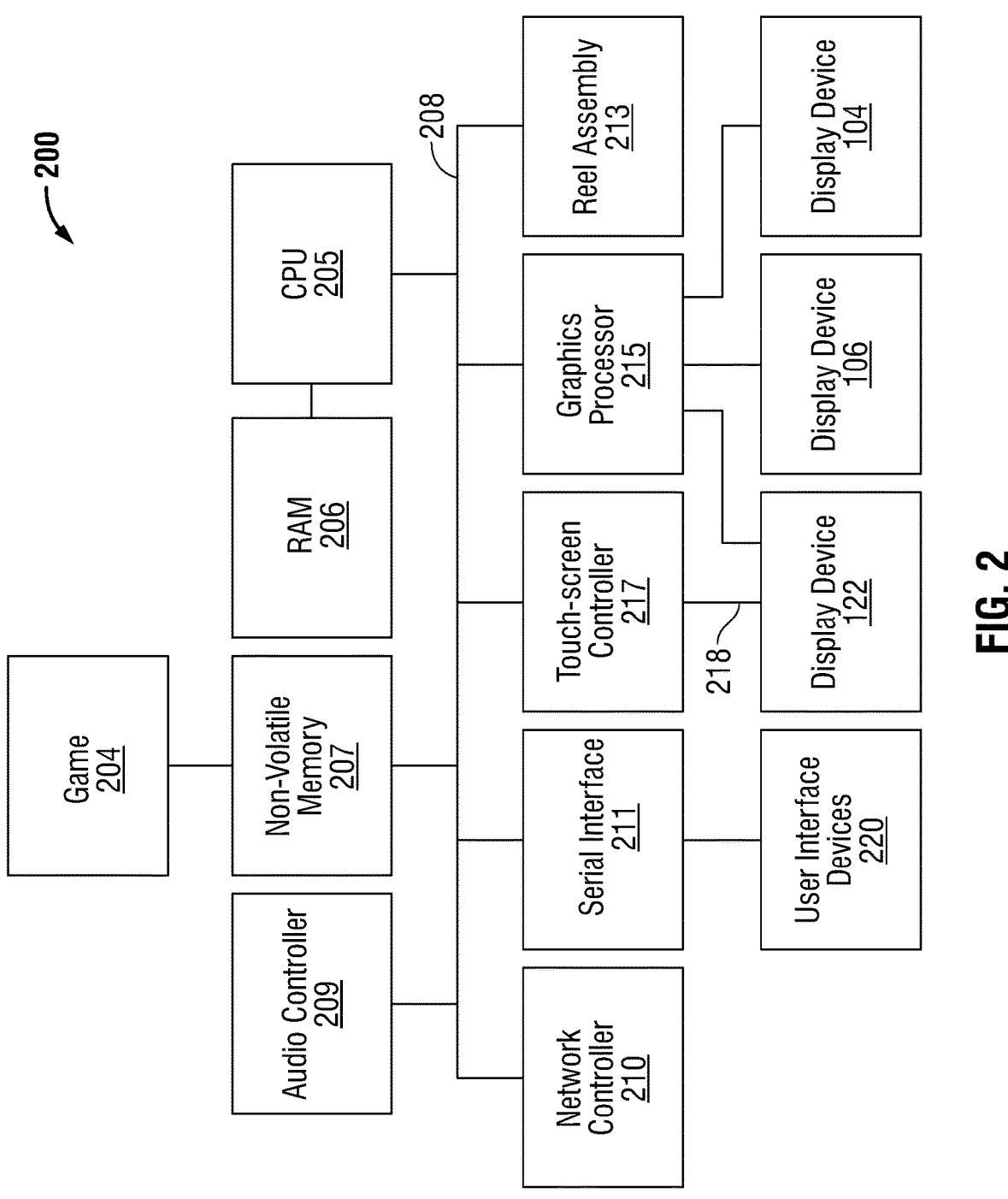
FIG. 2 is a block diagram showing the various components that may be included in the example gaming machine shown in FIG. 1.

FIG. 2 shows a logical and hardware block diagram 200 of gaming machine 100 that includes a processor (CPU) 205 along with a suitable connection to random access memory (RAM) 206. CPU 205 and a non-volatile memory 207 device are connected on a system bus 208 with an audio controller device 209, a network controller 210, a serial interface 211, and a graphics processor 215. Graphis processor 215, or another graphics processor included in the gaming machine but not shown in this diagram, may provide a suitable video output to video display devices included on the gaming machine such as video display devices 104 and 106 and touch screen display device 122 and/or a touch screen display device (not shown) mounted on the button deck of gaming machine 100. Multiple graphics processors may be required depending upon the number of display devices included on the gaming machine. As shown in FIG. 2, gaming machine 100 also includes a touch screen controller 217 connected to system bus 208. Touch screen controller 217 is also connected via signal path 218 to receive signals from a touch screen element (not shown) associated with video display device 122 in this example.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with a personal computer, although they may be specially designed and configured for use in a gaming environment. These elements may be mounted on one or more circuit boards housed within cabinet 101 with or without a separate enclosure. Those familiar with data processing systems and the various data processing elements shown in FIG. 2 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211 (a USB controller for example). It will also be appreciated that some of the devices shown in FIG. 2 as being connected directly on system bus 208 may in fact communicate with the other system components through a suitable expansion bus. Audio controller 209, for example, may be connected to the system via a PCI or PCIe bus or bus configured according to some other expansion bus standard. System bus 208 is shown in FIG. 2 merely to indicate that the various components are connected in some fashion for communication with CPU 205 and is not intended to limit the invention to any particular bus architecture.

Numerous other variations in the gaming machine internal structure and system may be used without departing from the principles of the present invention. For example, a gaming machine in some embodiments of the present invention may rely on one or more data processors located remotely from the gaming machine itself. Embodiments of the present invention may include no processor such as CPU 205 or graphics processor such as 215 at the gaming machine, and may instead rely on one or more remote processors. Thus unless specifically stated otherwise, the designation "gaming machine" is used in this disclosure and the accompanying claims to designate a system of devices that operate together to provide the indicated functions. A "gaming machine" may include a gaming machine such as gaming machine 100 shown in FIGS. 1 and 2, that is itself a system of various components, and may also include one or more components remote from a gaming machine cabinet (that is, remote from the cabinet portions 102 and 120 of gaming machine 100 in FIG. 1). As used herein, the designation "gaming machine" encompasses both a stand-alone gaming machine and a gaming machine along with one or more remote components for providing various functions (such as identifying prizes for a given play and controlling result display graphics and performing other operations).

It will also be appreciated that graphics processors are also commonly a part of modern computer systems. Although separate graphics processor 215 is shown for controlling display devices 104, 106, and 122, CPU 205 or a graphics processor packaged with or included with CPU 205 may control all of the display devices directly without any separately packaged graphics processor. The invention is not limited to any particular arrangement of processing devices for controlling the display devices included with gaming machine 100. Also, a gaming machine implementing the present invention is not limited to any particular number of video display devices or other types of display devices. While display devices 104, 106, and 122 are shown in the example implementation, the display device area may be arranged differently than the portrait orientation shown or may be an area of a single display device.

Control of display devices 104, 106, and 122 will include a suitable driving signal for driving the respective display. Such a driving signal may include any video signal format or standard that the respective display device is adapted to receive. For example, a DisplayPort, HDMI, or DVI signal may be used to drive a respective one of the displays to provide the desired images. Of course, each display will commonly receive operating power separately from the display driving signal. As will be discussed further below in connection with FIG. 7, the control of the brightness level for the switchable portion of display device 106 may be provided through the signal used to drive the display device or through a separate control signal, that is, a signal separate from the DisplayPort, HDMI, DVI, etc. signal. The brightness level in portions of display device 106 may also be controlled manually as will be described further below in connection with FIG. 7.

In the illustrated gaming machine 100, CPU 205 executes software, that is, program code, that ultimately controls the entire gaming machine including the receipt of player inputs and the presentation of the graphics or information displayed through the display devices 104, 106, and 122 and any other display devices associated with the gaming machine. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise mass storage device providing storage for game software (program code) prior to loading into random access memory 206 for execution, or for programs and program assets not in use or for other data generated or used in the course of gaming machine operation. Network controller 210 provides an interface to other components of a gaming system in which gaming machine 100 may be included.

It should be noted that the invention is not limited to gaming machines employing the specially configured general purpose processing devices and personal computer-type arrangement of processing devices and interfaces shown in example gaming machine 100. Other gaming machines through which the invention may be implemented may include one or more special purpose processing devices to perform the various processing steps for implementing the invention.

Reel Assembly 213 comprises a reel assembly for mechanical reels mounted behind glass 118 in FIG. 1 as described above but not shown in the figures. Although the invention is not limited to any particular mechanical reel arrangement or control system, mechanical reels may be controlled conveniently through serial communications to a reel controller that provides instructions for a respective stepper motor for each reel. Thus some embodiments of the present invention that employ mechanical reels may use a serial interface device such as serial interface 211 to control communications with the reel assembly and may not include a direct bus interconnection as indicated by FIG. 2. Furthermore a gaming machine including a switchable brightness display in accordance with the present invention need not include any mechanical reels or other mechanical spinning elements.

Figure 3:
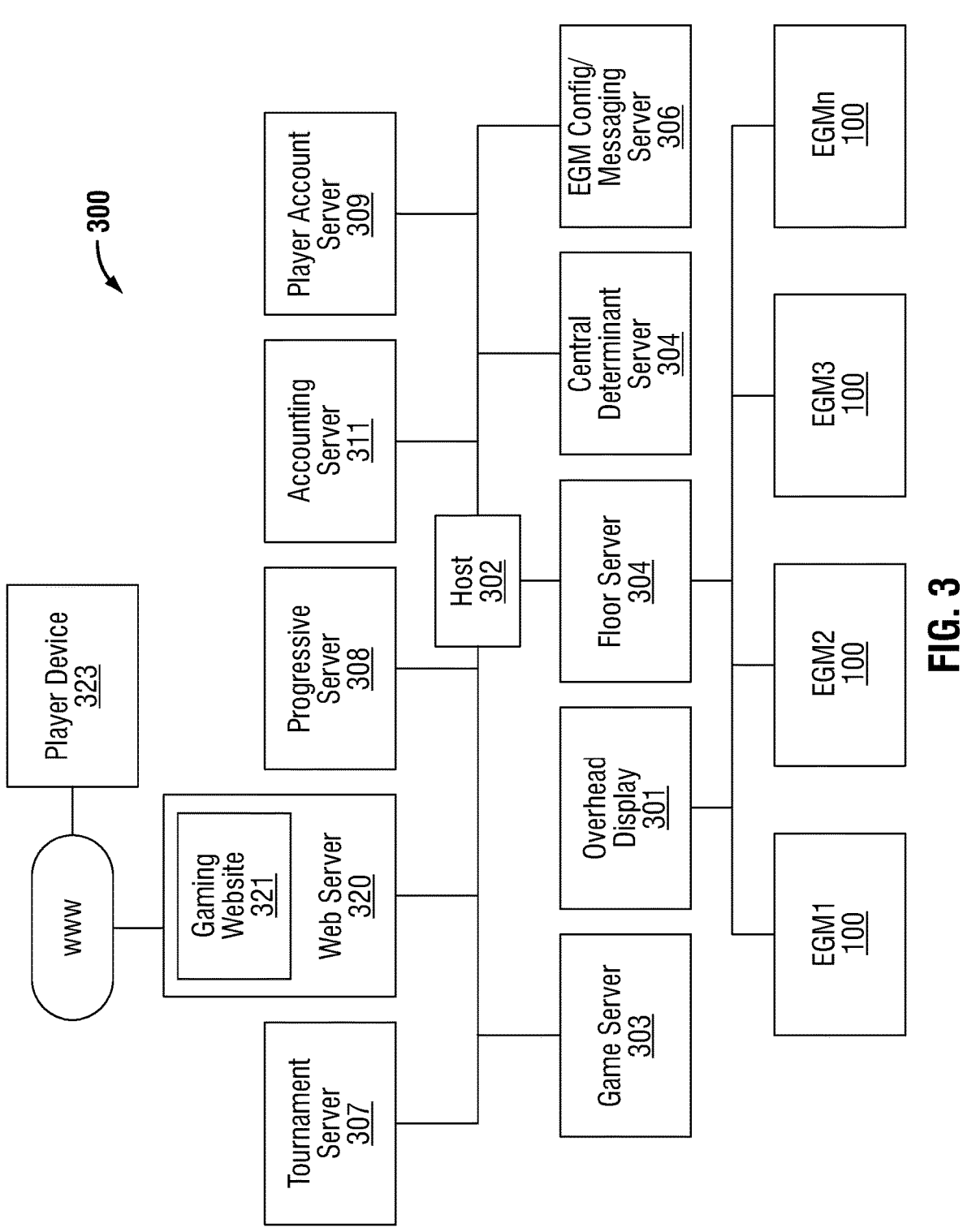
FIG. 3 is a block diagram of an example gaming system including gaming machines such as that shown in FIG. 1.

Referring now to FIG. 3, a networked gaming system 300 associated with one or more gaming facilities may include one or more networked gaming machines 100 (shown in FIG. 3 as EGM1-EGMn) connected in the network by suitable network cable or wirelessly. Networked gaming machines 100 and one or more overhead display devices 301 may be operatively connected so that the overhead display device or display devices may mirror or replay the content of one or more displays of gaming machines 100. For example, the display content for a given gaming machine 100 (including a base game portion and/or bonus features) may be transmitted through network controller 210 to a controller associated with the overhead display device(s) 301. In the event gaming machines 100 have cameras installed, the respective player's video images may be displayed on overhead display device 301 along with the content of the player's gaming machine display.

The example gaming network 300 shown in FIG. 3 includes a host server 302 and floor server 304, that together may function as an intermediary between floor devices such as gaming machines 100 and back-office devices such as the various servers described below. Game server 303 may provide server-based games and/or game services to network connected gaming devices such as gaming machines 100. Central determinant server 305 may be included in the network to identify or select lottery, bingo, or other centrally determined game results and provide the result information to networked gaming machines 100 that present the games or game results to players.

EGM configuration and messaging server 306 may provide game and non-game content and operational software for use by the gaming machines 100 in the course of providing games and while the gaming machines are unused and in an idle state. For example, server 306 may control the distribution of game software and graphic control assets to the gaming machines as well as advertising messages and other messages that may be presented using a display device of a gaming machine 100.

Tournament server 307 may be included in the system for controlling or coordinating tournament functions. These functions may include maintaining tournament player scores and ranking during the course of tournament play, and communicating this information to the various gaming machines 100 participating in the tournament. Tournament server 307 may also function to enroll players in tournaments, schedule tournaments, and maintain the time remaining in the various tournaments.

Progressive server 308 may maintain progressive pools for progressive games that may be available through the various gaming machines 100. In some implementations, progressive server 308 may simply receive communications indicating contribution amounts that have been determined by processes executing at the various gaming machines 100 or elsewhere in the gaming network. Alternatively, progressive server 308 may perform processes to determine the contribution amounts for incrementing the various progressive pools that may be maintained. Progressive server 308 may also periodically communicate current pool values back to the various gaming machines 100 and may participate in communicating awarded progressive prize amounts to the gaming machines and in adjusting the progressive prize pools accordingly. In some implementations, progressive server 308 may also determine or participate in determining when a progressive prize triggering event occurs.

Accounting server 311 may receive gaming data from each of the networked gaming devices, perform audit functions, and provide data for analytical programs. Player account server 309 may maintain player account records, and store persistent player data such as accumulated player points and/or player preferences (for example, game personalizing selections or options).

Example gaming network 300 also includes a gaming website 321 that may be hosted through web server 320 and may be accessible by players via the Internet. One or more games may be displayed and played by a player through a player device 323 such as a wired or wireless personal computer or handheld wireless device (for example, an Android® operating system smart phone, Apple® iPhone® smart phone, personal digital assistant (PDA), iPad® or other tablet computer, etc.). To enter website 321, a player may log in with a user name that may, for example, be associated with the player's account information stored on player account server 309. Once logged in to website 321 the player may play various games on the website. Also, website 321 may allow the player to make various personalizing selections and save the information so it is available for use during the player's next gaming session at a casino establishment having the gaming machines 100.

Gaming network 300 illustrated in FIG. 3 is provided merely as an example of a gaming network that may include gaming machines with candle systems according to aspects of the present invention and is not intended to be limiting in any way. Gaming machines having one or more brightness switching displays according to aspects of the present invention are not limited to use with gaming networks such as network 300.

Figure 4:
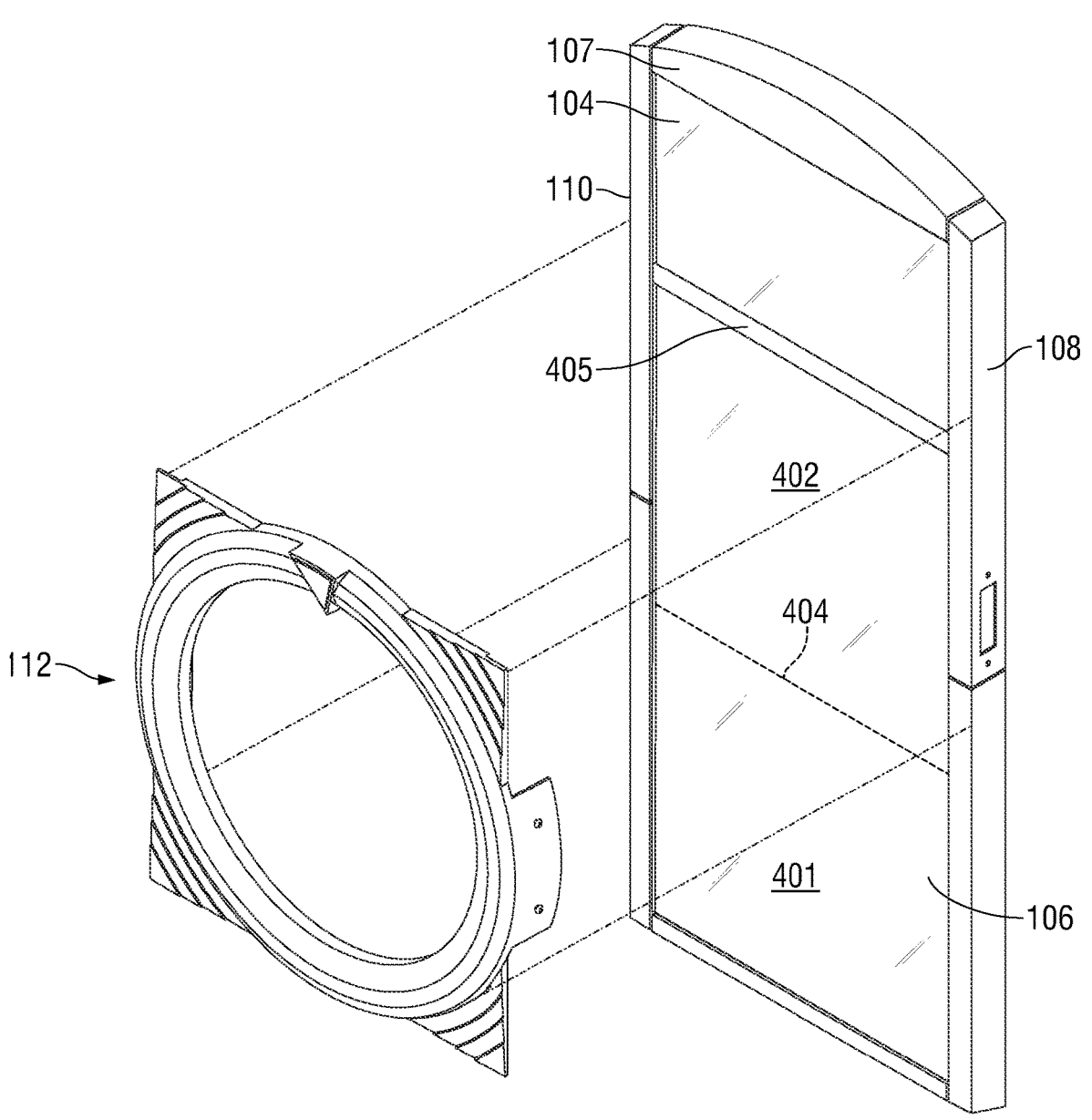
FIG. 4 is an isometric view of an uppermost display assembly of the gaming machine shown in FIG. 1 with the circular bezel shown separated from the rest of the display assembly.
Figure 5:
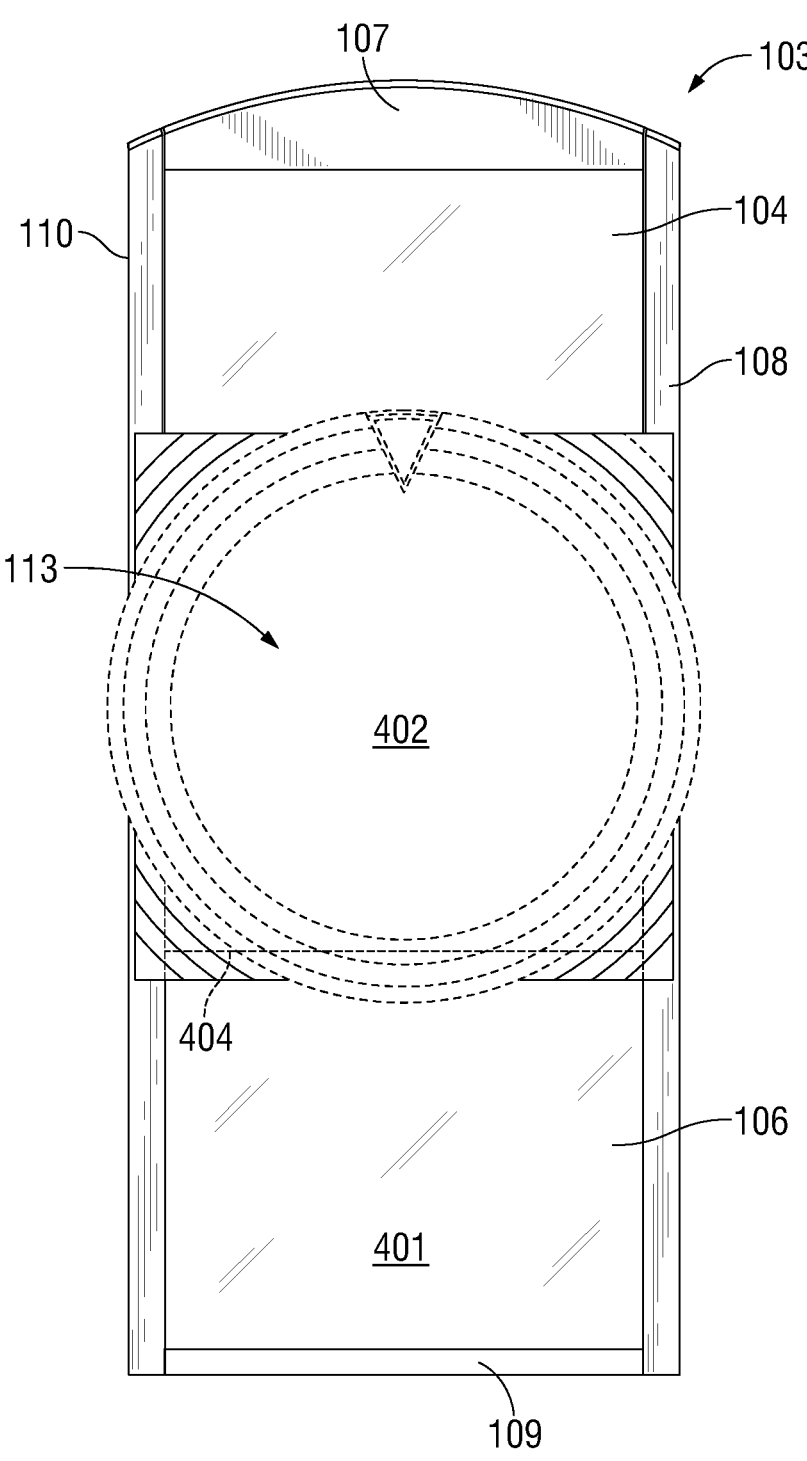
FIG. 5 is a front view of the uppermost display assembly of the gaming machine shown in FIG. 1 with the circular bezel shown in phantom lines.

FIGS. 4 and 5 show the upper cabinet display arrangement 103 separated from gaming machine 100. The isometric view of FIG. 4 shows bezel assembly 112 exploded away from the rest of upper cabinet display arrangement 103 in particular the entire front surface of second display device 106 (a switchable brightness level display device in this example). The front view of FIG. 5 shows bezel 112 in its installed operating position on upper cabinet display arrangement 103 but in phantom lines so that the entire front surface of display device 106 remains visible in the view. In both FIGS. 4 and 5, dashed line 404 indicates a boundary between two different display areas of second display device 106, that is, dashed line 404 does not represent structure at that location but just denotes an imaginary boundary between display areas. A first display area 401 is located below dashed line 404 in the orientation of the figures while a second display area 402 is located above dashed line 404. Segregated circular display area 113 (shown in FIG. 5) comprises only a portion of second display area 402 in this example. First display device 104 in this example comprises an entirely separate display device from second display device 106. Upper cabinet display assembly 103 includes an element 405 covering the upper edge of second display device 106 and the lower edge of first display device 104 for gaming applications in which bezel 112 is not used.

Referring particularly to FIG. 5, a lower portion of bezel 112 covers the dashed line 404 representing the boundary between first display area 401 and second display area 402 of second display device 106. This portion of bezel 112 covering the boundary between display areas of second display device 106 represents a dividing feature for the switchable brightness display device, or at least part of a dividing feature for second display device 106. The purpose of the dividing feature, whether in the form of bezel 112 or an alternative feature, will be described further below in connection with the operation of second display device 106 as a switchable brightness level display device.

It should be noted here that the invention is not limited to display arrangements such as display arrangement 103 that is mountable as a unit on a gaming machine cabinet. In other implementations, a display that embodies a switchable brightness level display device in accordance with the present invention may be mounted on a suitable structure within the cabinet and then a suitable cover/bezel arrangement may be secured over the display device.

Figure 6:
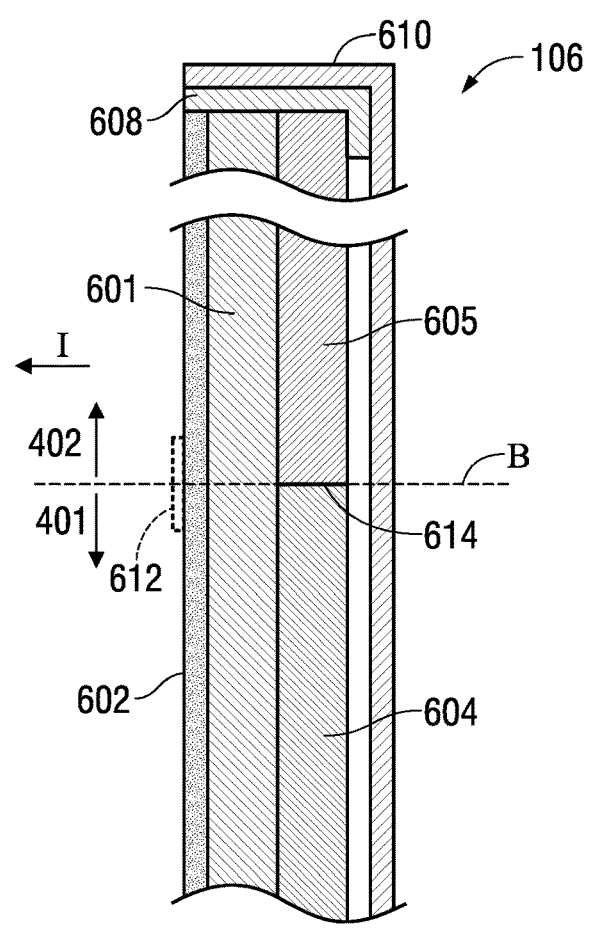
FIG. 6 is a schematic vertical section representation of a portion of display device 106 in FIGS. 1, 4, and 5.

The schematic partial section view of FIG. 6 shows an example structure for second display device 106 separated from the remainder of display arrangement 103 (FIGS. 1, 4, and 5) facing in an image presenting direction I to the left in the orientation of the figure. FIG. 6 shows that second display device 106 includes an image forming panel 601, cover 602 and two backlighting arrangements one associated with each of the display areas 401 and 402 of second display device 106. A first backlighting arrangement 604 is located behind first display area 401 and a second backlighting arrangement 605 is located behind second display area 402. Image forming panel 601, cover 602 and the backlighting arrangements 604 and 605 are shown in this example mounted in a frame 608 which is itself mounted in a housing 610. It should be appreciated that some implementations may not require a separate housing such as housing 610 or at least a back wall of such a housing because the backlighting arrangements 604 and 605 may themselves have a rear component providing the function of a housing. Also, switchable brightness level display devices according to aspects of the present invention are not limited to any particular arrangement for holding the various components of the display device, namely, the image forming panel, any cover, and the backlighting arrangements, in the desired relative operating positions shown in FIG. 6.

In the schematic view of FIG. 6 dashed box 612 represents a dividing feature which may be part of bezel 112 as described above or some other covering arrangement. For example dividing feature 612 may comprise an opaque coating on cover 602. In any event, the covering portion of a dividing feature in accordance with the present invention is preferably located so as to cover the boundary between first backlighting arrangement 604 and second backlighting arrangement 605. This boundary in the view of FIG. 6 is at the level indicated by dashed line B and this level corresponds to the dashed boundary line 404 shown in FIGS. 4 and 5. The example of FIG. 6 further includes a light baffle 614 located between the two backlighting arrangements 604 and 605. Such a light baffle at the boundary between backlighting arrangements may be thought of as part of a dividing feature as will be described further below in connection with the operation of second display device 106.

The two different backlighting arrangements 604 and 605 shown in FIG. 6 are included in display 106 in order to selectively provide different levels of brightness over a portion of the overall display area of second display device 106. In this example, first backlighting arrangement 604 is mounted within housing 610 for emitting first display area back light over first display area 401 at a first brightness level. Second backlighting arrangement 605 is mounted within housing 610 for emitting second display area back light over the second display area 402. In accordance with the present invention, the second display area back light is switchable between a first illumination state at the first brightness level and a second illumination state at a second brightness level higher than the first brightness level. Thus while the first display area back light provided by backlighting arrangement 604 remains at the first brightness level for first display area 401, the brightness level for display area 402 is switchable between the first brightness level and the higher second brightness level.

Figure 7:
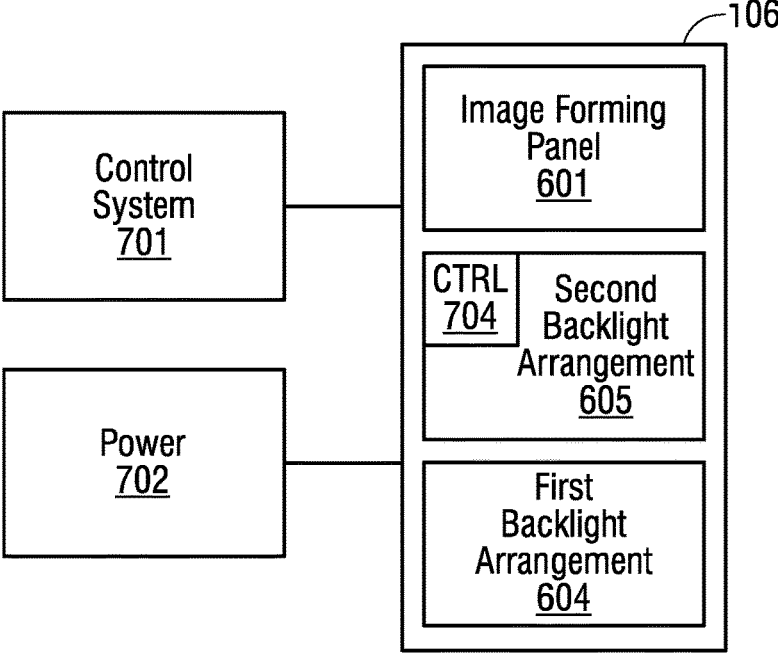
FIG. 7 is a block diagram including the display device shown in FIG. 6.

The block diagram of FIG. 7 shows an arrangement for controlling second display device 106. Control system 701 provides instructions in a suitable format for causing second display device 106 to produce the desired images over both areas of the display device, areas 401 and 402, while power supply 702 provides power for second display device 106, particularly, the image forming panel 601 and the two backlighting arrangements 604 and 605 shown in FIG. 6. Generally, the relatively higher brightness provided in the second illumination state of second backlighting 605 will require higher power per unit area as compared to the power for providing the first brightness level through the first backlighting arrangement 604. FIG. 7 shows a controller 704 that switches between the two power levels for second backlighting arrangement 605 in this example. The switching may include simply switching off power to a subset of illumination elements of second backlighting arrangement 605 for operation in the first illumination state and supplying power to that subset of illumination elements along with the remainder of the illumination elements in second backlighting arrangement 605 for operation in the second illumination state. This method of switching will be described further below in connection with FIGS. 8 and 9. Alternatively, the two different illumination states provided by backlighting arrangement 605 may be provided through a common set of illumination elements that are driven at two different power levels, a first power level for the first illumination state and a higher second power level for the second illumination state. It should also be noted that the illumination state switching for backlighting arrangement 605 may be accomplished by a manually operated switch. However, use of a controller such as controller 704 allows switching illumination states in an automated fashion coordinated with events in the course of a game presentation. In any event, it will be noted that no corresponding switching device (corresponding to controller 704) is needed for first backlighting arrangement 604 since that backlighting arrangement operates continuously to provide the first brightness level across first display area 401 while the brightness level across second display area 402 is switchable between the two different brightness levels. Of course, the present invention encompasses providing more than two different brightness levels selectively in a given display area such as display area 402. Furthermore, in some implementations the higher brightness level provided in the second display area may static and not switchable to the lower brightness level. In these implementations no switching arrangement is needed for the second display area.

It should be noted here that the present switchable brightness levels are independent of localized brightness level adjustments that may be performed by a given display device to produce deeper blacks and higher contrast ratios. Also, although particularly FIGS. 4 and 5 indicate that second display 402 comprises a relatively large forward facing area of second display device 106, the display area provided a higher brightness level in accordance with the present invention need not be a large area and may be on any display device regardless of orientation in the gaming machine. In particular, the area provided higher brightness according to the invention may comprise a small area of a display device, such as, for example, one or more virtual buttons or other virtual controls displayed on a display device.

Figure 8:
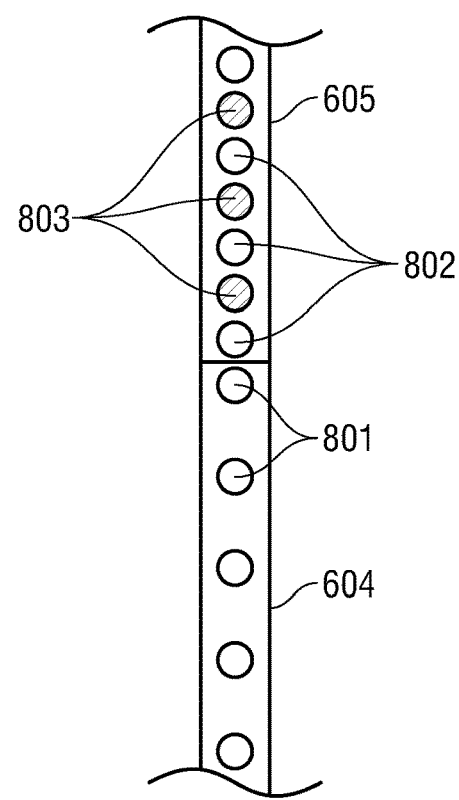
FIG. 8 is a schematic representation of an edge lighting arrangement in accordance with the present invention.
Figure 9:
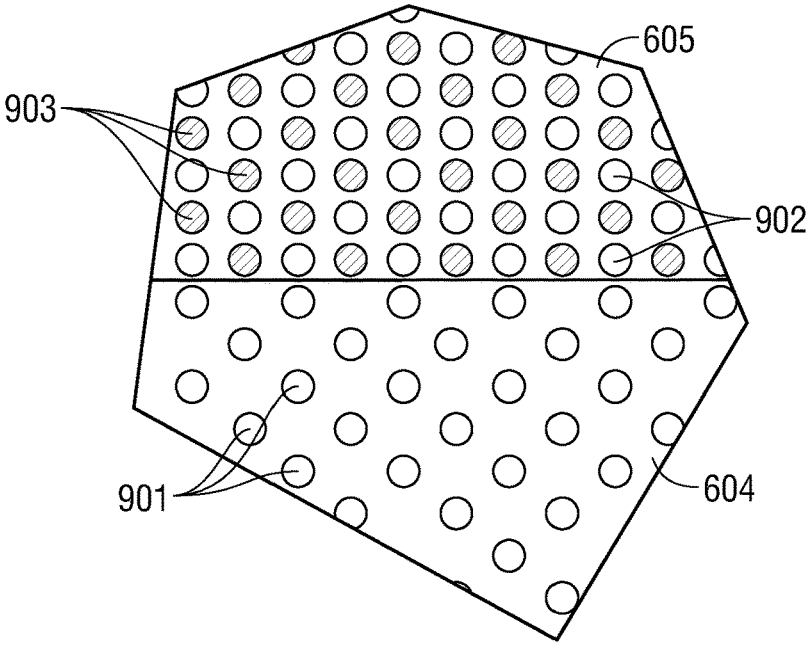
FIG. 9 is a schematic representation of a direct backlighting arrangement in accordance with the present invention.

FIGS. 8 and 9 show two different examples in which the higher illumination level in the second display area 402 may be provided by additional illumination elements in the second backlighting arrangement 605. These figures show only a portion of the two backlighting arrangements 604 and 605 with a light baffle 614 dividing the two backlighting arrangements.

Referring first to FIG. 8, that figure shows illumination elements for an edge backlighting arrangement. The edge lighting arrangement of FIG. 8 shows a portion of a first display area set of illumination elements 801 for backlighting arrangement 604. Second backlighting arrangement 605 includes a second display area set of illumination elements 802. Backlighting arrangement 605 further includes an additional set of illumination elements 803 (shown with crosshatching). In operation, the first display area set of illumination elements 801 in backlighting arrangement 604 provide the first display area backlight at the first brightness level. For the first illumination state of second backlighting arrangement 605, the second display area set of illumination elements 802 in second backlighting arrangement 605 similarly provide second display area backlight at the first brightness level. When it is desired to change the illumination state of second backlighting arrangement 605 to the second illumination state, the additional set of illumination elements 803 are powered on (such as through controller 704 in FIG. 7 or by operating a manual switch) to provide the higher brightness level.

As an alternative to the arrangement illustrated in FIG. 8 where the illumination elements 803 are inter-digited in a single row with illumination elements 803, implementations may place illuminations elements 803 in a separate row or strip from illumination elements 802. Such separate rows of illumination elements may, for example, run parallel to each other but separated in the image presenting direction of the display device.

FIG. 9 shows a similar illumination element arrangement in the context of a direct backlighting system. First backlighting arrangement 604 in FIG. 9 includes a first set of illumination elements 901 while second backlighting arrangement 605 includes a second set of illumination elements 902. Second backlighting arrangement 605 in FIG. 9 also includes an additional set of illumination elements 903 (shown in crosshatching). In operation of the backlighting arrangement shown in FIG. 9 in accordance with the invention, the first set of illumination elements 901 for first backlighting arrangement 604 and the second set of illumination elements 902 for second backlighting arrangement 605 are driven to provide the first brightness level over the entire area of the display device. When the higher brightness level is desired for the second display area backlit by second backlighting arrangement 605, the additional set of illumination elements 903 are powered on (such as through controller 704 in FIG. 7 or by operating a manual switch) to increase the brightness level provided in that area of the display. In some implementations the additional set of illumination elements 903 may be on a different circuit than the second set of illumination elements 902 to facilitate powering the additional set of illumination elements 903 on or off. This separate circuit arrangement applies as well to the edge-lighting example of FIG. 8.

It should be appreciated that the arrangements of illumination elements shown in FIGS. 8 and 9 are shown only for purposes of example and embodiments of the present invention are not limited to these arrangements. For example, although FIGS. 8 and 9 both show essentially twice as many illumination elements in second backlighting arrangement 605 as compared to first backlighting arrangement 604, other implementations may not double the number of illumination elements (or the density of illumination elements in terms of number per unit area) and may increase the number (that is, increase the illumination element density) by any amount suitable for providing the second, higher brightness level. Also, as noted above, some embodiments may include the same number (that is, number per unit area) for each backlighting arrangement 604 and 605, and selectively increase the brightness in second backlighting arrangement 605 by switching to a higher the driving power to the illumination elements to provide the higher illumination level.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as "top," "bottom," "upper," "lower," and the like are used with reference to the orientation of the figures unless specifically stated otherwise.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A gaming machine display device including:
(a) a display device housing;
(b) an image forming panel mounted on the display device housing and defining an overall display area facing in an image presenting direction and encompassing both a first display area and a second display area, the second display area being distinct from the first display area;
(c) a first backlighting arrangement mounted within the display device housing for emitting first display area backlight over the first display area at a first brightness level; and
(d) a second backlighting arrangement mounted within the display device housing for emitting second display area backlight over the second display area, the second display area backlight being at a second brightness level higher than the first brightness level while the first display area backlight remains at the first brightness level;
wherein the second display area backlight is switchable between a first illumination state at the first brightness level and a second illumination state at the second brightness level, further including a dividing feature separating the first display area and the second display area, wherein the dividing feature includes an opaque bezel mounted over a front surface of the of the image forming panel in the image presenting direction.

2. The gaming machine display device of claim 1 wherein the dividing feature includes an opaque coating located over a front surface of the image forming panel in the image presenting direction.

3. The gaming machine display device of claim 1 further including a transparent front cover covering a front surface of the image forming panel and wherein the dividing feature includes an opaque coating located on the transparent front cover.

4. The gaming machine display device of claim 1 wherein the dividing feature includes a light baffle extending in a plane perpendicular to a plane of the overall display area.

5. The gaming machine display device of claim 1 wherein:
(a) the first backlighting arrangement includes a first display area set of illumination elements operable to provide the first display area backlight over the first display area at the first brightness level; and
(b) the second backlighting arrangement includes (i) a second display area set of illumination elements operable to provide the second display area backlight over the second display area at the first brightness level and further includes (ii) an additional set of illumination elements operable together with the second display area set of illumination elements to provide the second brightness level.

6. A gaming machine display device including:
(a) a display device housing;
(b) an image forming panel mounted on the display device housing and defining an overall display area facing in an image presenting direction and encompassing both a first display area and a second display area, the second display area being distinct from the first display area;
(c) a first backlighting arrangement mounted within the display device housing for emitting first display area backlight over the first display area at a first brightness level; and
(d) a second backlighting arrangement mounted within the display device housing for emitting second display area backlight over the second display area, the second display area backlight being at a second brightness level higher than the first brightness level while the first display area backlight remains at the first brightness level;
wherein the second display area backlight is switchable between a first illumination state at the first brightness level and a second illumination state at the second brightness level, and wherein:
the first backlighting arrangement includes a first display area set of illumination elements arranged in an illumination element density and operable to provide the first display area backlight over the first display area at the first brightness level; and (b) the second backlighting arrangement includes a second display area set of illumination elements arranged in the illumination element density and operable to (i) provide the second display area backlight over the second display area at the first brightness level and (ii) alternatively provide the second display area backlight over the second display area at the second brightness level.

7. A gaming machine including:
(a) a gaming machine cabinet;
(b) a display device housing mounted on the gaming machine cabinet;
(c) an image forming panel mounted on the display device housing and defining an overall display area facing in an image presenting direction and encompassing both a first display area and a second display area, the second display area being distinct from the first display area;
(d) a first backlighting arrangement mounted within the display device housing for emitting first display area backlight over the first display area at a first brightness level;
(e) a second backlighting arrangement mounted within the display device housing for emitting second display area backlight over the second display area, the second display area backlight being switchable between the first brightness level and a second brightness level higher than the first brightness level while the first display area backlight remains at the first brightness level; and (f) an electronic control system mounted on the gaming machine cabinet the electronic control system being operable for controlling operation of the image forming panel, first backlighting arrangement, and second backlighting arrangement;

(g) a dividing feature separating the first display area and the second display area, wherein the dividing feature includes a light baffle extending in a plane perpendicular to a plane of the overall display area.

8. The gaming machine of claim 7 wherein the dividing feature includes an opaque bezel mounted over a front surface of the of the image forming panel in the image presenting direction.

9. The gaming machine of claim 7 wherein the dividing feature includes an opaque coating located over a front surface of the image forming panel in the image presenting direction.

10. The gaming machine of claim 7 further including a transparent front cover covering a front surface of the image forming panel and wherein the dividing feature includes an opaque coating located on the transparent front cover.

11. The gaming machine of claim 7 wherein the dividing feature includes a light baffle extending in a plane perpendicular to a plane of the overall display area.

12. The gaming machine of claim 7 wherein:
(a) the first backlighting arrangement includes a first display area set of illumination elements operable to provide the first display area backlight over the first display area at the first brightness level; and
(b) the second backlighting arrangement includes (i) a second display area set of illumination elements operable to provide the second display area backlight over the second display area at the first brightness level and further includes (ii) an additional set of illumination elements operable together with the second display area set of illumination elements to provide the second brightness level.

13. The gaming machine of claim 7 wherein:
(a) the first backlighting arrangement includes a first display area set of illumination elements arranged in an illumination element density and operable to provide the first display area backlight over the first display area at the first brightness level; and
(b) the second backlighting arrangement includes a second display area set of illumination elements arranged in the illumination element density and operable to (i) provide the second display area backlight over the second display area at the first brightness level and (ii) provide the second display area backlight over the second display area at the second brightness level.

* * * * *